United States Patent [19]

Shibata et al.

[11] 4,403,211

[45] Sep. 6, 1983

[54] AUTOMATIC TURN-SIGNAL CANCELLING SYSTEM

[75] Inventors: Yasuo Shibata, Kawagoe; Yukio Miyamaru, Tokyo; Shigeo Kawada, Wako; Kaoru Hatanaka, Kamifukuoka, all of Japan

[73] Assignee: Honda Giken Kogyo Kabushiki Kaisha, Tokyo, Japan

[21] Appl. No.: 312,340

[22] Filed: Oct. 16, 1981

[30] Foreign Application Priority Data

Nov. 26, 1980 [JP] Japan .............................. 55-166352

[51] Int. Cl.$^3$ .............................................. B60Q 1/42
[52] U.S. Cl. ........................................ 340/73; 340/55; 340/56
[58] Field of Search ................... 340/73, 55, 56, 81 R, 340/81 F

[56] References Cited

U.S. PATENT DOCUMENTS 4,058,797 11/1977 Sekiguchi et al. .................... 340/73
4,264,891 4/1981 Bergmann et al. .................. 340/73

4,333,071 6/1982 Kira et al. .............................. 340/56

Primary Examiner—Donald J. Yusko
Attorney, Agent, or Firm—Lyon & Lyon

[57] ABSTRACT

There is disclosed herein a turn signal system for vehicles wherein the turn signal is automatically cancelled upon the steering device of the vehicle being returned to a predetermined position. The system is particularly applicable to motorcycles. The system includes a sensor which generates a signal representing a steering angle corresponding to the operation of the steering device, a noise eliminating circuit which receives the sensor signal and eliminates noises included in this signal as a function of running speed of the vehicle. A peak hold circuit receives the output signal from the noise eliminating circuit and holds the peak value of the signal, and a comparator receives the output signal of the noise eliminating circuit as well as the output of the peak hold circuit, and compares these signals to generate a turn-signal cancelling signal when the steering device has been returned by a predetermined amount toward its normal position.

11 Claims, 12 Drawing Figures

AUTOMATIC TURN-SIGNAL CANCELLING SYSTEM

BACKGROUND OF THE INVENTION

The present invention relates to turn-signal systems for vehicles, and more particularly to an automatic cancelling system for such turn-signal systems.

Various vehicles, such as automobiles, are in general equipped with an automatic turn-signal cancelling device, sometimes referred to as an automatic winker or flasher cancelling device. In automobiles, steering wheels commonly are used and the cancelling device is arranged to measure by mechanical means a certain return amount of the steering wheel from the maximum steering position, and then the turn-signal is automatically cancelled when the measured return movement of the steering wheel exceeds a set level. Such arrangements take advantage of the relatively large degree of rotation of the steering wheel or large steering angle involved with automobiles.

On the other hand, while the application of such automobile automatic turn-signal cancelling devices to motorcycles has been considered, it is relatively difficult because of the different steering arrangement for motorcycles which involves not only the steering angle of the handle bars but also the shift or tilt angle of the front wheel of the motorcycle. The shift or tilt angle of the front wheel is about the same as the steering angle of the handle bars and, therefore, the amount of change in the steering angle of the handle bars required in changing the running direction of the motorcycle is relatively small. Furthermore, the arrangements used in automobiles have further disadvantage if applied to motorcycles because although the steering angle is measured with respect to the center position of the handle bars, accurate determination of the center position of the handle bars of a motorcycle is difficult in the manufacture and use of the motorcycle, thereby resulting in difficulties in accurately measuring the steering angle. Additionally, when the running speed of the motorcycle is reduced, and after a turn signal has been turned on but before a sufficient change in the running direction of the motorcycle, the turn signal may be cancelled because of the necessary movement by the operator of the handle bars for maintaining balance. That is, these low frequency pertubations of the handle bars can cause the turn-signal to be cancelled prior to when they should be cancelled in practice.

SUMMARY OF THE INVENTION

According to the present invention, an automatic turn-signal cancelling system is provided for vehicles wherein steering angles are converted into electrical signals for processing by an electronic system, and the turn-signal is automatically cancelled when the steering device is returned almost to the center position after changing the running direction of the vehicle during normal running and when the signal intensity of the detected signal varying with the turning of the steering device from its maximum steering angle back toward the center position exceeds a predetermined level. Stated differently, the angle of the steering device is sensed and converted to an electrical signal, the maximum steering angle is sensed and held, and after the steering device has moved to the maximum steering angle and then returns towards the center position a cancelling signal is generated after the steering device moves back toward the center position by a set or predetermined amount as determined, for example, by a comparison being made between the maximum angle and the actual return angle. Additionally, the system in a preferred form includes means for eliminating or attenuating noise signals from the steering device which result from the turning and movement of the steering device during low speed running. Several exemplary embodiments of such automatic systems are shown and described herein.

Accordingly, it is an object of the present invention to provide an improved automatic turn-signal cancelling system for vehicles.

Another object of the present invention is to provide an automatic turn-signal cancelling system which electronically responds to a maximum steering angle in a vehicle turn situation, and a predetermined return from the maximum angle toward a neutral position to provide a cancelling signal.

Another object of the present invention is to provide an improved method of cancelling a turn-signal.

While the present invention is applicable to vehicles in general, it is particularly applicable to motorcycles and will be discussed in the environment of a motorcycle. In an exemplary embodiment of the present invention, a steering angle sensor is provided for sensing the angle of the handle bars (steering device) of a motorcycle and providing a signal representing the steering angle. This signal is applied to a noise elimination circuit which also receives, as an input, a signal which is a function of the speed of the vehicle. This circuit attenuates the steering angle signal during low speed running of the vehicle so as to reduce noise which occurs as a function of the low frequency movements or perturbations of the handle bars, as during balancing of the vehicle. The output of the noise eliminating circuit is applied to a peak hold circuit which stores, temporarily, the maximum steering angle during a turn. The output of the noise eliminating circuit also is applied to a comparator, as is the peak signal held by the peak hold circuit. The comparator performs an electrical comparison and when the amount of return movement of the steering device from the maximum toward the neutral exceeds a predetermined or set amount, a cancelling signal is generated to turn off the turn signals. Operation of the system is initiated when the operator initially moves the turn signal switch to indicate a left turn or a right turn. This operation also enables the peak hold circuit to commence holding or storing the steering angle signal and to hold the peak or maximum value thereof indicative of the maximum steering angle for a given turn.

The above-described features and objects of the present invention will be better understood through a consideration of the following description taken in conjunction with the drawings in which:

DESCRIPTION OF THE DRAWINGS

FIG. 7b illustrates a modification of the system of FIG. 7a; and

FIG. 8a and 8b comprise another embodiment of a system according to the present invention wherein FIG. 8a is general block diagrams with details of turn signal switches, and FIG. 8b is a detailed electrical diagram.

DESCRIPTION OF THE PREFERRED EMBODIMENTS

Figure 1:
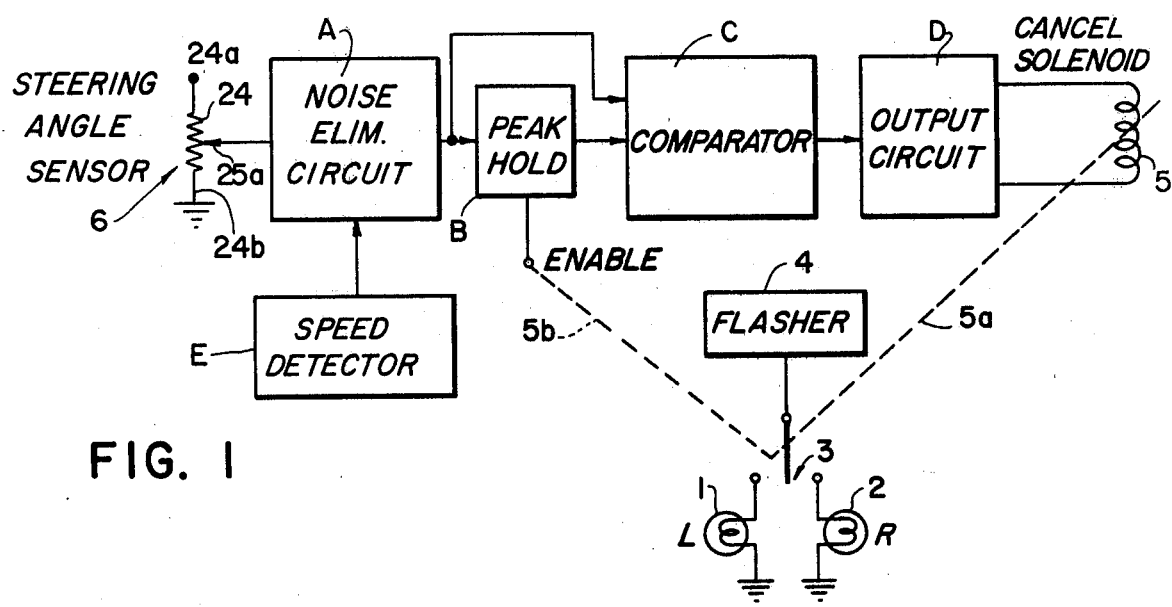
FIG. 1 is a simplified general overall block diagram illustrating the automatic turn-signal and cancelling system of the present invention for which detailed electrical diagrams are provided in other figures.

Turning now to the drawings, and first to FIG. 1, this figure merely provides a general block diagram of exemplary systems according to the present invention. Specific electronic circuits and systems according to the block diagram of FIG. 1 are shown in other Figures and will be discussed later. The system of FIG. 1 includes a pair of conventional turn-signal lamps or bulbs 1 and 2 for indicating respective left and right turns. One or the other of these lamps is energized via a turn signal switch 3 which is connected with a flasher or relay 4 for supplying pulses of electrical power to the selected lamp, all as is well known. A cancel solenoid 5 is electromagnetically associated with the switch 3 as indicated by dashed line 5a to "cancel" the switch 3; that is, return the switch 3 to the neutral position as seen in FIG. 1 at the appropriate time. The cancel solenoid 5 is energized by the electronic system at the appropriate time as is further explained below. When the turn signal 3 is moved to the left or right to indicate a turn, a signal as diagrammatically indicated at 5b is applied to enable a peak hold circuit B.

A potentiometer 6 serves as a steering angle sensor and is mounted in association with the steering device of the vehicle, such as the handle bars of a motorcycle, as will be discussed in connection with the description of FIGS. 2 and 3. This potentiometer 6 is connected to a noise elimination circuit A which serves to eliminate noise in the electrical signal from the potentiometer 6 by attenuating the lower frequency signals, such as those which result from movement of the steering device during low speed running. The output signal from the noise elimination circuit A is applied to a peak hold circuit B and also as an input to a comparator C. The output of the peak hold circuit is applied as the other input to the comparator C.

The peak hold circuit serves, when enabled by the turn signal switch 3, to store the peak or maximum steering angle signal from the potentiometer 6 as attenuated by the noise elimination circuit A. It thus stores the maximum steering angle during a turn after the turn signal switch 3 is manually operated by the driver of the vehicle. The attenuated steering angle signal from circuit A is continuously supplied to the comparator C during a turn-signal operation. This is the actual instantaneous steering angle.

The comparator C serves to provide an output signal when the steering device has returned a predetermined amount from the maximum steering angle. This is accomplished by comparing the peak signal held by the circuit B with the instantaneous steering angle signal from circuit A. When the steering device has returned a predetermined amount as detected by the comparator C, an output signal is applied to an output circuit D which energizes the cancel solenoid 5. As stated above, the cancel solenoid 5 serves to cancel the turn signal switch 3 to its neutral position (as shown in FIG. 1).

A speed detector circuit E senses the speed of the vehicle, and provides a speed signal to the noise elimination circuit A to cause the noise elimination circuit A to attenuate the signal from the potentiometer 6 during the low speed running condition as noted earlier.

Figure 2:
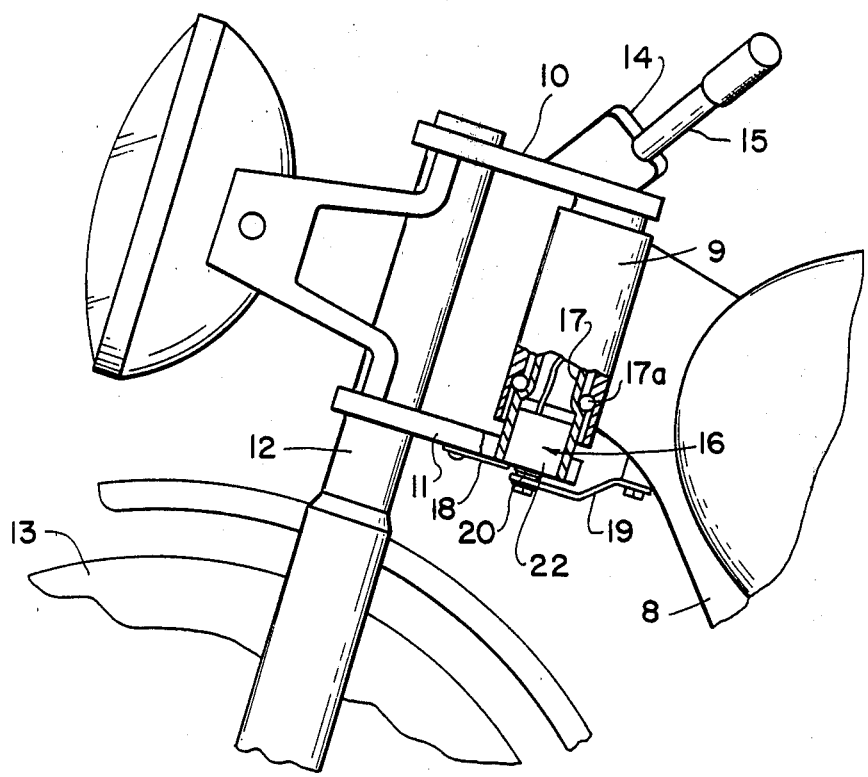
FIG. 2 is a diagrammatic view of the steering system of a motorcycle showing a steering angle sensor associated with the handle bars of the motorcycle.

Turning now to the manner in which the steering angle is determined, FIG. 2 shows an exemplary motorcycle comprising a frame 8 having a headpiece 9. A top bridge 10 and a bottom bridge 11 are fixed to a front fork 12 holding a front wheel 13. These bridges are coupled to a steering stem 17. A bracket 14 is connected to the top bridge 10, and handle bars 15 are connected to the bracket 14 for steering the motorcycle in a conventional manner. The steering angle sensor is designated 16, and it is mounted in the bottom of the steering stem 17, and is retained therein by a mounting arm 18. A bracket 19 is affixed between the frame 8 and a shaft 20 of the sensor 16. Suitable bearings 17a are provided between the headpiece 9 and the steering stem 17.

Figure 3A:
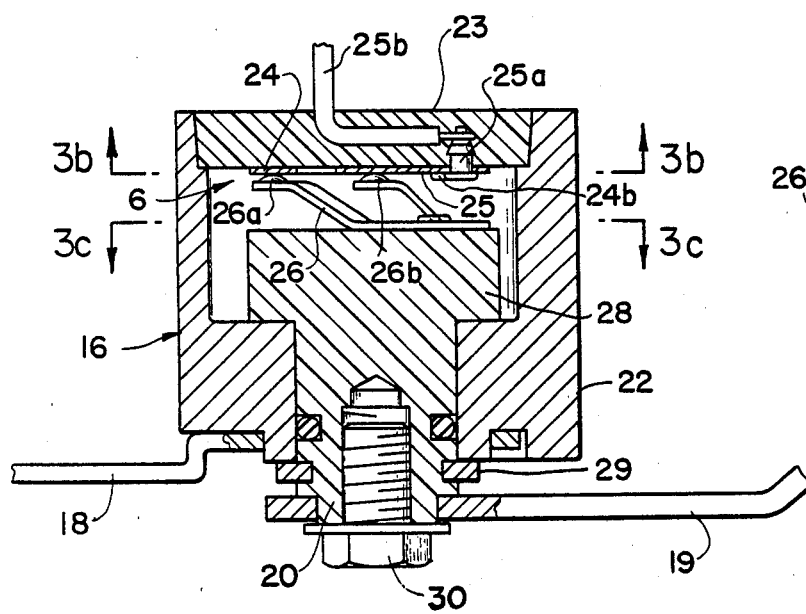
FIG. 3a is a cross-sectional view of the steering angle sensor.
Figure 3B:
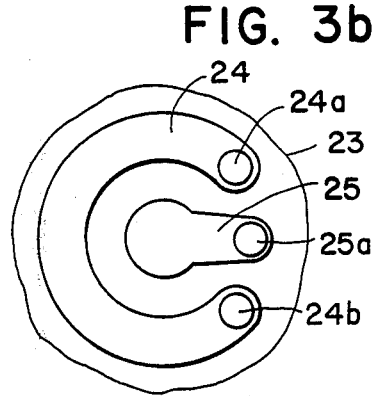
FIGS. 3b and 3c are further diagrammatic views of components thereof.
Figure 3C:
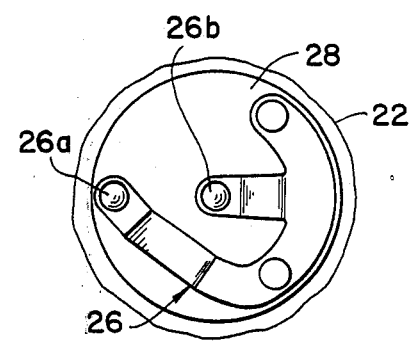

FIGS. 3a through 3c show more details of the steering angle sensor 16. This sensor includes a case 22 which is retained in the steering stem 17 by the mounting arm 18 such that the case 22 is fixed with respect to the stem 17. The upper portion of the case 22 contains the potentiometer 6, and this potentiometer comprises a resin base 23 secured to the case 22 and supporting a resistive element 24 and a metal contact 25. The potentiometer 6 also comprises a spring contactor 26 formed of metal and including contact points 26a and 26b. The contactor 26 is formed of resilient metal so as to provide good wiping contact with the resistive element 24 and the metal contact 25. The contactor 26 is secured to a contact spring support 28 formed of insulating material and which terminates in the sensor shaft 20. The support 28 is suitably mounted in the case 22 and retained therein by a clip ring 29. The bracket 19 is secured to the sensor shaft 20 by a nut 30. As will be apparent to those skilled in the art, the support 28 is maintained in a fixed position with respect to the frame 8 of the motorcycle by the bracket 19, and the case 22 can rotate as the handle bars 15 rotate the front fork 20 for steering by virtue of the mounting arm 18. This causes relative motion between the resistive element 24 and the spring contact 26. The terminals 24a–24b of the resistive element 24 and the terminal 25a of the metal contact 25 of the potentiometer are designated in FIG. 1 also. While suitable electrical wires are connected to each of these three contacts, only a wire 25b connected to the terminal 25a is seen in FIG. 3a.

Figure 4:
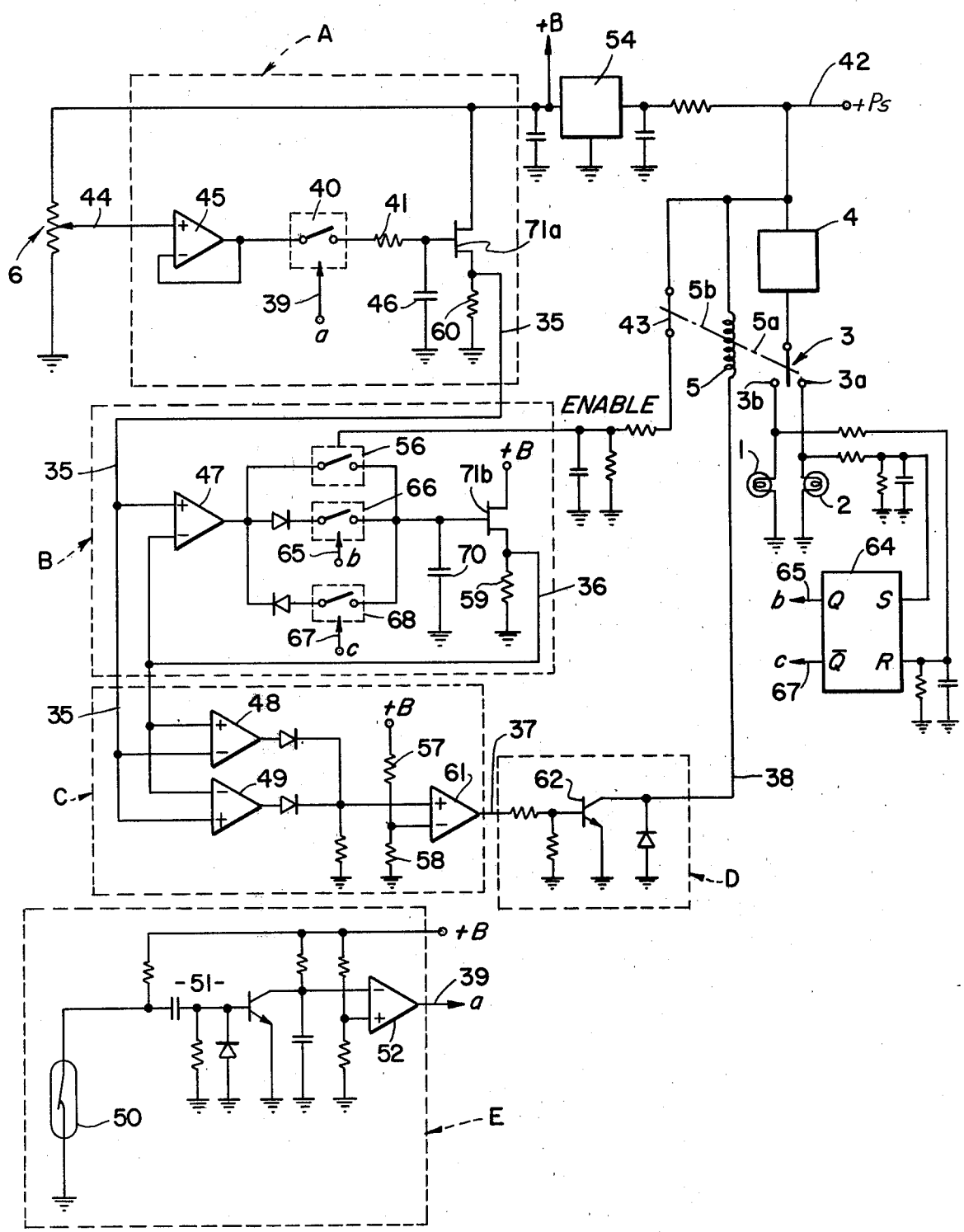
FIG. 4 is a detailed electrical diagram, according to the block diagram of FIG. 1, of a first embodiment of a system according to the present invention.

Turning now to the first specific exemplary embodiment shown in FIG. 4, various parts of the electrical circuit diagram of FIG. 4 have been enclosed in blocks and labelled with reference letters and numbers similar to those used in the general block diagram of FIG. 1. Thus, the steering angle sensor potentiometer 6 is connected to the noise eliminating circuit A which has an output 35 connected to the peak hold circuit B and to the comparator C. The peak hold circuit B has an output 36 connected to the comparator C. The comparator C has an output 37 connected to the output circuit D which, in turn, has an output 38 connected to the cancel solenoid winding 5. The speed detector E has an output 39 which provides a pulse signal to a switch 40 in the noise eliminating circuit A.

A turn signal lamp 1 or 2 is selected by the operator's turn-signal switch 3, and the selected lamp is caused to blink by the flasher or relay 4 which is connected to a power supply line 42. The switch 3 is interlocked with the solenoid winding 5 as well as with a normally closed switch 43. The switch 43 provides the "enable" function to the peak hold circuit B earlier discussed with respect to FIG. 1.

The output of the steering angle sensor potentiometer 6 is supplied by a line 44 to an amplifier 45, the output of which is connected to the semi-conductor switch 40 in the noise eliminating circuit A. This circuit A has an input/output characteristic which changes with the output of the speed detecting circuit E, and this characteristic is a function of running speed to inhibit the output of the noise eliminating circuit A by attenuating its input during low speed running of the vehicle. The noise eliminating action of the circuit A during low speed running is provided via the action of the switch 40 which is switched on and off as a function of the speed signal on the line 39 from the speed detector E. The frequency at which the signal on the line 39 from the speed detector E goes high increases with an increase in running speed and decreases with a decrease in running speed. Accordingly, the frequency of closing of the switch 40, which is closed when the output signal on line 39 is high, increases with an increase in running speed and decreases with a decrease in running speed. Thus, the time constant of a resistor 41 and capacitor 46 virtually changes corresponding to the running speed. This virtual time constant remains large while the running speed is low and gradually approaches a time constant dependent on the values of the resistor 8 and capacitor 9 when the running speed is high. Through this variable time constant action, the signal from the potentiometer 6 during high speed running is transmitted almost as it is to an amplifier 47 in the peak hold circuit and to amplifiers 48 and 49 in the comparator C. On the other hand, the signal sent to the amplifiers 47-49 from the noise eliminating circuit A is attenuated during low speed running. The speed detector E includes a reed switch 50 arranged in a conventional manner with respect to a magnet on a drive component of the vehicle to turn on and off as a function of running speed, and its signal is applied through a suitable pulse forming circuit 51 to an amplifier 52 to provide the speed signal on the output line 39. Electrical power (+B) is supplied to the potentiometer 6, the noise eliminating circuit A, the speed detector E, and the other portions of the system from the power supply (e.g., battery) line 42 through a voltage regulator 54.

Turning now to the peak hold circuit B, when the turn-signal switch 3 is off, a semiconductor switch 56 remains closed since the switch 43 is normally closed. During the time the switch 56 is closed the output of the amplifier 47 is directly connected to a storage capacitor 70 and a transistor 73 through the switch 56. At this time the outputs of differential amplifiers 48-49 of the comparator C are lower than a voltage determined by resistors 57 and 58 since the terminal voltage of a resistor 59 at the output of the peak hold circuit B is the same as the terminal voltage of a resistor 60 at the output of the noise eliminating circuit A. That is, the voltage across the resistor 59 follows the voltage across the resistor 60, and the voltage is lower than that determined by the values of resistor divider 57-58. Consequently, the output of an amplifier 61 at the output of the comparator C remains at a low level, and a transistor 62 in the output circuit D remains off so that the output circuit D provides no output on the output 38.

When the turn-signal switch 3 is connected to either the right terminal 3a or to the left terminal 3b to indicate a right or left turn, the switch 43 is opened which in turn opens the switch 56 in the peak hold circuit B. At this time one of the turn-signal lamps 1 or 2 is blinked on and off by the flasher 4, and a trigger pulse is provided to either a set terminal S or to a reset terminal R of a flip-flop circuit 64. The Q output 65 of the flip-flop 64 is connected to control a semiconductor switch 66 in the peak hold circuit B, and the Q output 6 is connected to control a semiconductor switch 68 in the peak hold circuit B. One or the other of the switches 66 or 68 is closed or turned on depending upon which of the turn-signals 1 or 2 is flashing. In the system arrangement of FIG. 4, the circuits are designed such that the operations of the handle bars in one direction and in the other direction to steer the vehicle to the right and to the left, respectively, correspond to an increase of the output voltage of the potentiometer 6 and the switch 3 causes the switch 66 of the peak hold circuit B to be closed, and a decrease in the output voltage of the potentiometer 6 while the switch 3 causes the switch 68 in the peak hold circuit B to be closed. Stated differently, if the motorcycle is steered to the right, the voltage of the potentiometer 6 increases and the switch 66 is caused to be closed; if it is steered to the left, the potentiometer voltage decreases and the switch 68 is closed. The output voltage of the input amplifier 47 of the peak hold circuit B is held or stored by the capacitor 70. Therefore, in steering the course of the vehicle, among the various output voltages provided by the potentiometer 6 as it moves, which are dependent on the angle and the direction of steering, the highest voltage which passes through the noise eliminating circuit A is stored on the capacitor 70 and is applied to the resistor 59 in the output of the peak hold circuit B. Field effect transistor 71a and 71b in the output circuits of the noise eliminating circuit A and peak hold circuit B, respectively, have high input impedances and prevent a variation of the terminal voltage of capacitors 46 and 70 in the respective A and B circuits which could result from a discharge of the capacitors or charging thereof from the amplifiers 47-49. Thus, the capacitors 46 and 70 accurately store the voltages applied thereto, and the stored voltages are available across the resistors 60 and 59 on respective lines 35 and 36.

In the comparator C, the momentarily changing terminal voltage of the resistor 60 of the noise eliminating circuit A and the terminal voltage of the resistor 59, held at a peak voltage on the capacitor 70 in the peak hold circuit B, are applied to respective terminals of the differential amplifiers 48 and 49 for comparison of these two input voltages. The amplifiers 48 and 49 are respectively provided for the right turn and the left turn functions. When the output voltage of the amplifier 48 or amplifier 49 becomes higher than a voltage established at the junction of resistors 57 and 58, the output of amplifier 61 of the comparator C on line 37 goes high and the transistor 62 in the output circuit D is turned on. In this case, the cancel solenoid 5 is energized to switch off the turn-signal switch 3; that is, to return the switch 3 to its neutral position, thereby automatically cancelling the turn signal. Thus, the amplifiers 48-49 electrically measure the return angle from the maximum steering angle, and when the measured return angle reaches a preset angle (such as, several degrees from the normal steering angle) as determined by the values of the resistors 57 and 58, the operation of the turn signal is automatically cancelled.

Figure 5:
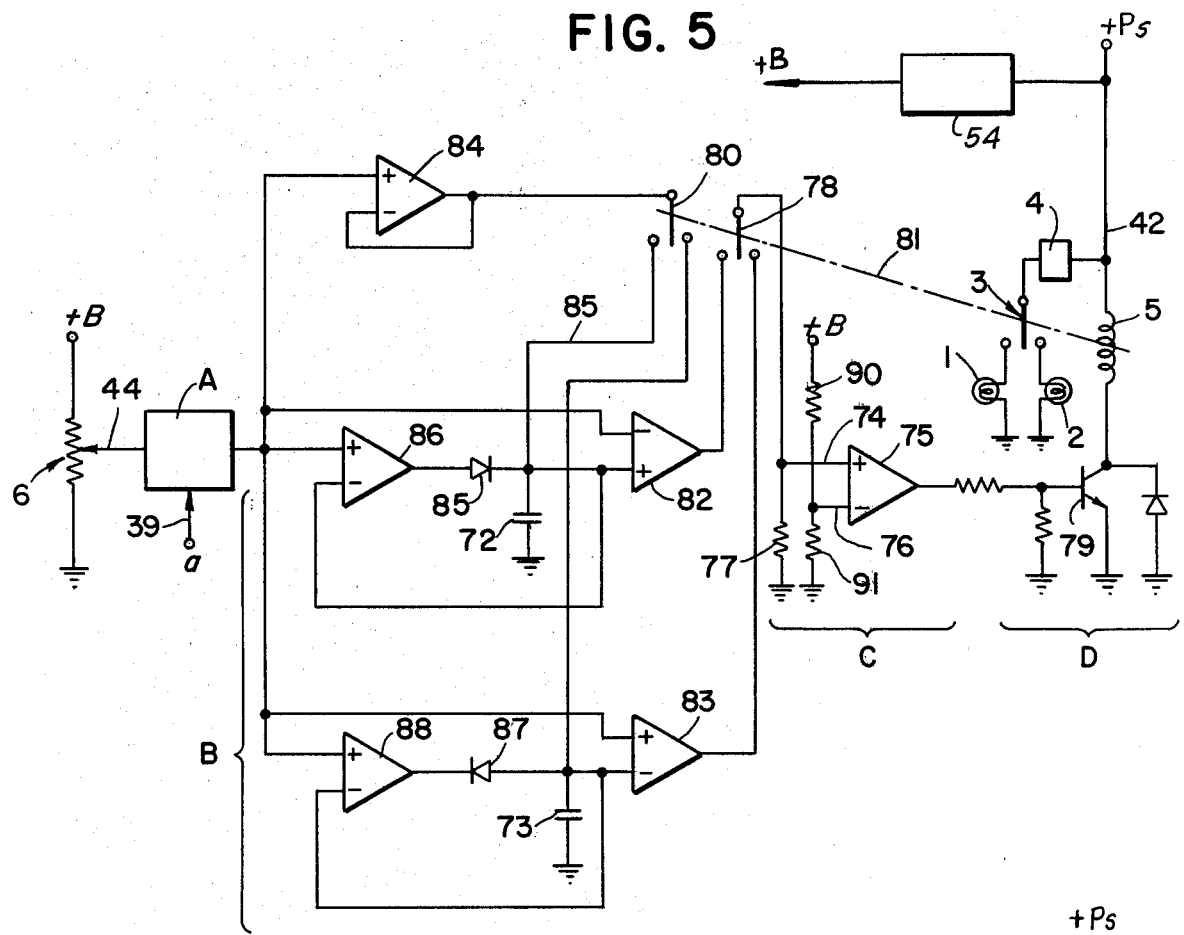
FIG. 5 is a detailed electrical diagram of a second embodiment thereof.

A second embodiment is shown in FIG. 5 which is similar to that of FIG. 4 and like reference numerals and letters are used to designate the same or similar components. One principal difference in the circuit of FIG. 5 is that a pair of capacitors 72 and 73 are used, one for storing the peak steering angle in one steering direction and the other for storing the peak steering angle in the opposite steering direction; whereas, a pair of switches 66 and 68 in the peak hold circuit B of FIG. 4 are used to store the peak steering angle on a single capacitor 70. Considering the operation of the circuit of FIG. 5, when the turn signal switch 3 is off, a positive input terminal 74 of a differential amplifier 75 is held at a voltage lower than that of its negative input terminal 76 by a resistor 77 since, at this time, a switch 78 also is open or off. In this case, the output of the amplifier 75 is at its low level and a transistor 79 in the output circuit D is off. On the other hand, when the turn signal switch 3 is connected with either the right or left contact, switches 78 and 80, via a mechanical connection 81, are likewise switched to respective right or left contacts of these switches 78 and 80 depending on the direction of operation of the turn-signal switch 3. Then, the output of either an amplifier 82 or an amplifier 83 in the peak hold circuit B is applied to the positive input terminal 74 of the amplifier 75 and, simultaneously, the output of an amplifier 88 is connected to either the capacitor 72 or the capacitor 73 so that the output voltage of the potentiometer 6 (as attenuated by circuit A) is applied to one or the other of these capacitors. Assume, for example, that the output of the potentiometer, through the noise eliminating circuit A, is applied through the amplifier 84 and the switch 80 to the capacitor 72 through a line 85. Then, the terminal voltage of the capacitor 72 increases to become the same as the output of the noise eliminating circuit A when the handle bars are operated to steer the course of the vehicle in the direction of operation of the turn-signal switch 3. This capacitor 72 stores a voltage proportional to the maximum steering angle. After the steering of the course of the vehicle has been completed and the handle bars are returned substantially to their center position, the voltage on the capacitor 72 remains stored therein because of the presence of a diode 85 connected between an amplifier 86 and the capacitor 72. A diode 87 performs a similar function for the reverse direction of travel of the handle bars. With the maximum steering angle voltage stored on the capacitor 72, the same is applied to one input of the amplifier 82, and the output (the instantaneous steering angle) of the noise eliminating circuit A is applied to the other input of the amplifier 82. The output of the amplifier 82 is applied through the switch 78 to the input 74 of the amplifier 75. When the output of the amplifier 82 exceeds a preset voltage determined by resistors 90 and 91, the output of the comparator amplifier 75 goes high and the transistor 79 is turned on to cause the cancel solenoid 5 to be energized and return the turn-signal switch 3 to its neutral position. A like electrical operation occurs when the voltage of the potentiometer 6 is applied through the noise eliminating circuit A to the capacitor 73, except the variation of the terminal voltage of the capacitor 73 and the operation of the amplifier 83 are for the reverse direction of movement of the handle bars.

Figure 6:
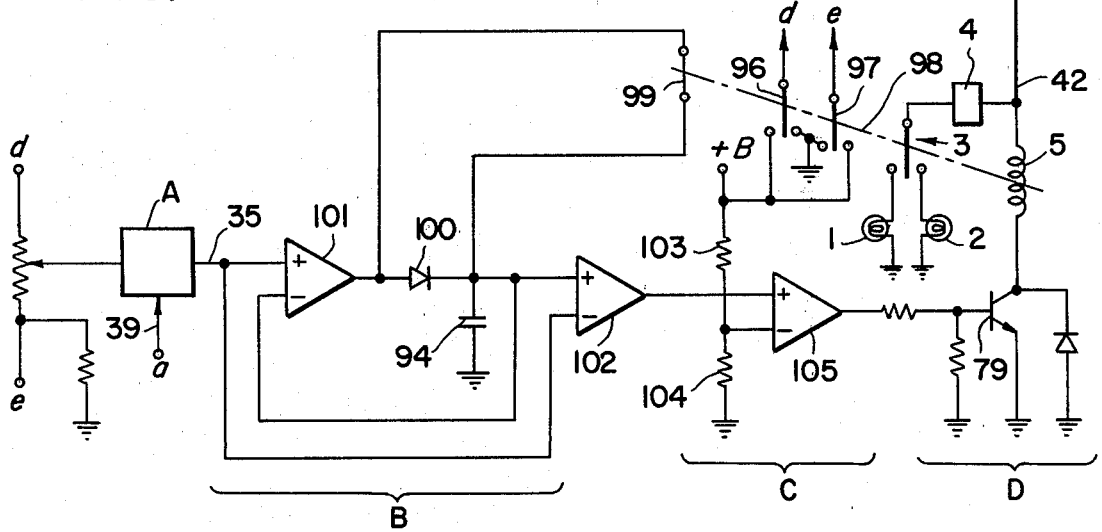
FIG. 6 is a detailed electrical diagram of a third embodiment thereof.

FIG. 6 illustrates a third embodiment of the present invention, and like reference letters and numerals are used to identify components which correspond to those of FIGS. 4 and 5. In this system, a single capacitor 94 replaces the two capacitors 72 and 73 of the FIG. 5 system, and the capacitor 94 stores the appropriate peak value for either direction of rotation of the handle bars. The system of FIG. 6 can be considered to include only one peak hold capacitor 94; whereas, the system of FIG. 5 can be considered to have two peak hold capacitors 72 and 73.

In FIG. 6, the connections of the potentiometer 6 are reversed depending upon the direction of rotation of the handle bars. The potentiometer 6 has two terminals d and e alternatively interchanged for the connection to power and ground according to the direction of operation of the turn-signal switch 3 which is connected to switches 96 and 97 by a mechanical link 98. With this arrangement, the voltage output of the potentiometer 6 changes only in one direction regardless of the direction of operation of the turn-signal switch 3. When the turn-signal switch 3 is turned off, a switch 99 is closed which provides a short circuit across a diode 100. With the switch 99 closed, the voltage on the capacitor 94 follows the voltage of the potentiometer 6 as applied through the noise eliminating circuit A and an amplifier 101. In this case, a transistor 79 in the output circuit D remains switched off since the output of an amplifier 102 remains lower than a voltage determined by resistors 103-104, and the output of an amplifier 105 stays at its low level. When the turn-signal switch 3 is switched on (to either the right or left contact), switches 99, 96 and 97 are moved in a like direction to a respective contact. Then, power is supplied to the potentiometer 6 at terminals d and e thereof with a polarity corresponding to the steering direction. At the same time, the short circuit provided by the switch 99 on the diode 100 is removed, thereby allowing the capacitor 94 to charge up in a manner described in connection with FIG. 5; that is, to store a voltage proportional to the maximum steering angle.

Figure 7A:
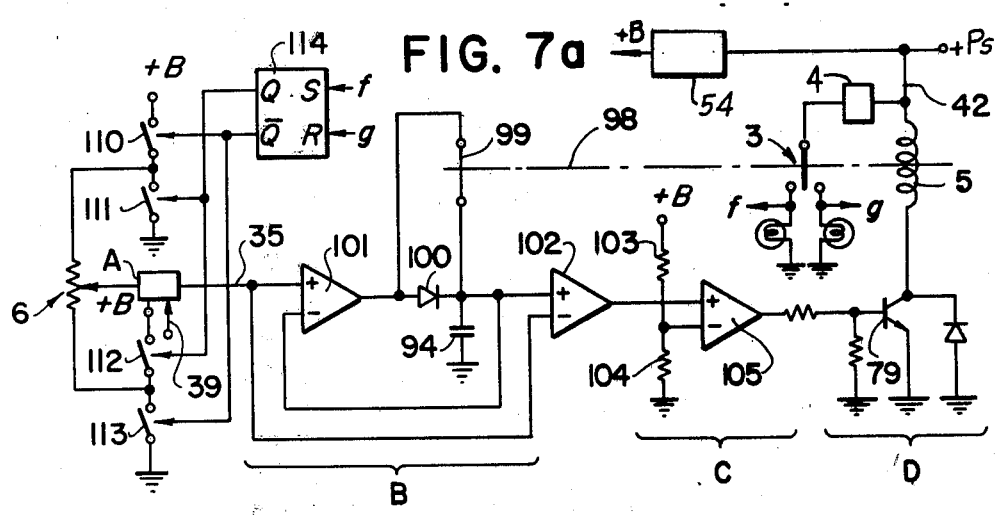
FIG. 7a is a detailed diagram of a fourth embodiment thereof.
Figure 7B:
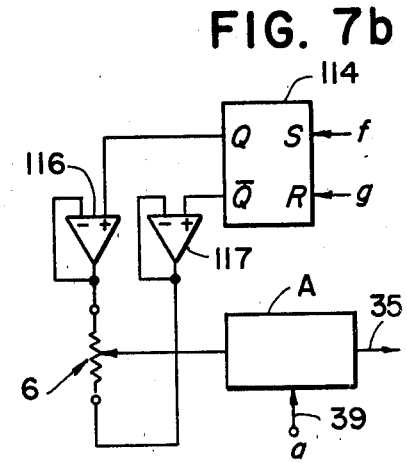

FIGS. 7a and 7b illustrate a fourth embodiment of the system of the present invention. In the arrangement of FIG. 6, the polarity of the regulated power (+B) connected to the potentiometer 6 was selectively changed through the use of the switches 96–97. In the system of FIG. 7a the polarity of the regulated power source is connected to the potentiometer 6 also is reversed, and this is accomplished through suitable semiconductor switches shown diagrammatically at 110 through 113. These switches are operated by a flip-flop 114. The turn-signal switch 3 provides a Set input f or a Reset input g, depending on the direction of operation thereof, to the flip-flop 114. When the flip-flop 114 is set by the signal f, the switch 111 is closed and the switch 112 is closed. This connects the bottom terminal of the potentiometer 6 to the regulated power and the upper terminal thereof to ground. When the flip-flop 114 is reset by the g input, the switches 110 and 113 are closed to thereby reverse the regulated power connections to the potentiometer 6. The remainder of the circuit of FIG. 7a operates in a manner similar to that of FIG. 6. FIG. 7b shows a modification of FIG. 7a wherein the flip-flop 114 drives switching amplifiers 116 and 117 to reverse the power supply connections to the potentiometer 6 in a like manner depending on the direction of moving the switch 3.

Figure 8A:
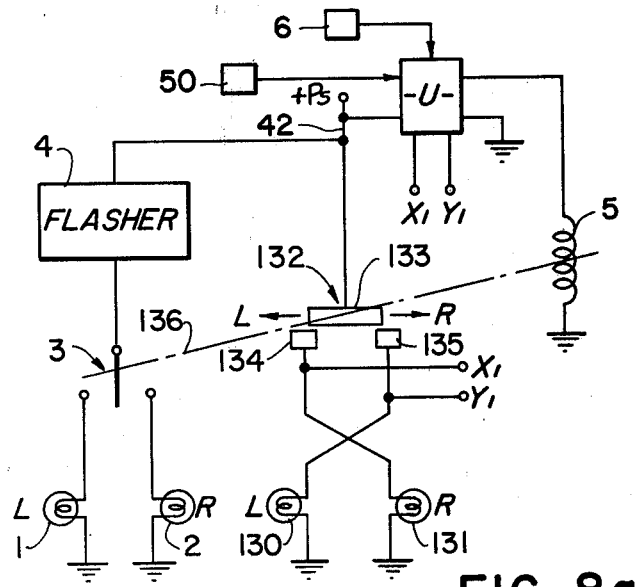
Figure 8B:
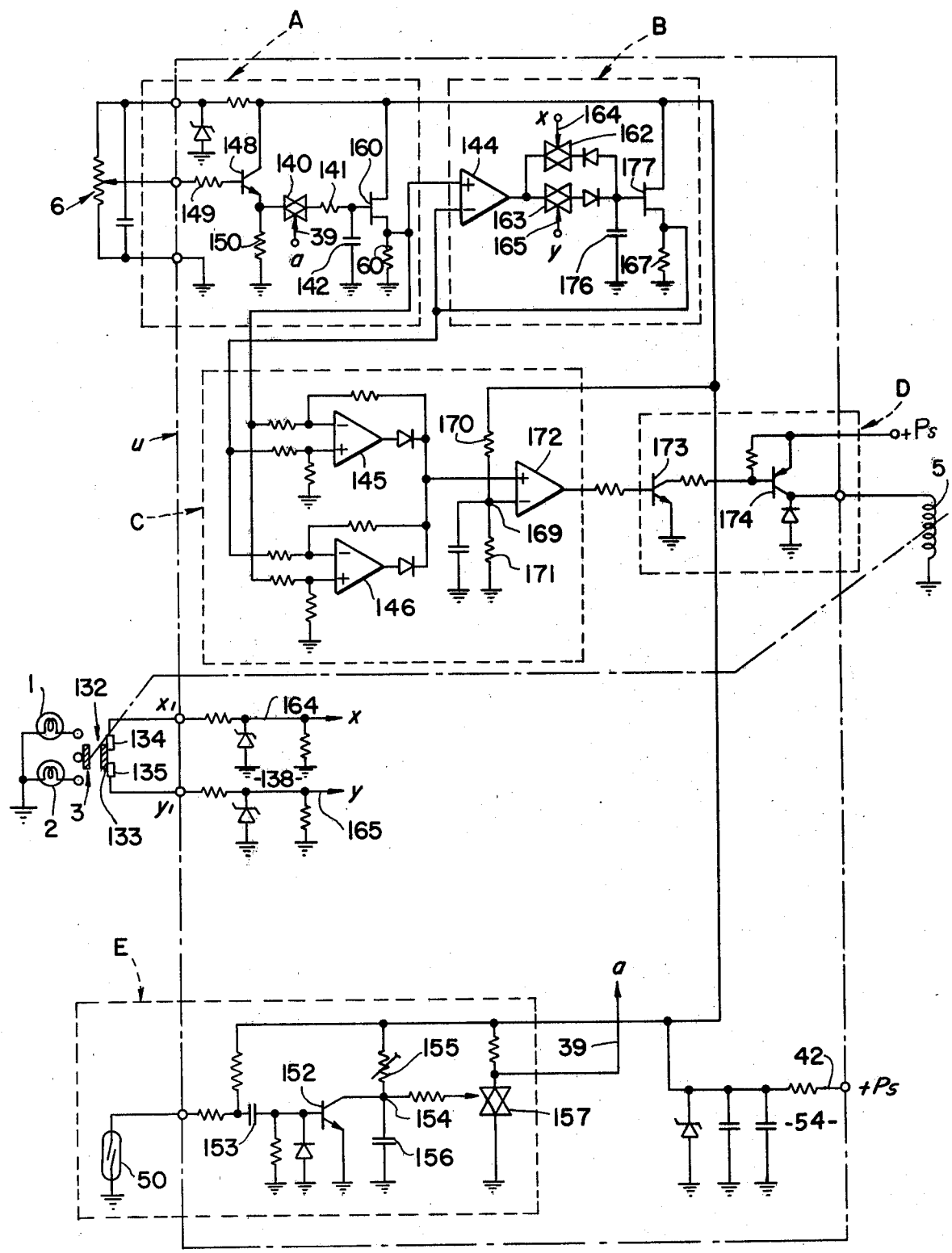

FIGS. 8a and 8b illustrate another embodiment of the system according to the present invention. FIG. 8a is a simplified block diagram but shows the turn signal switches in detail, and FIG. 8b is a detailed electrical diagram of the system, but illustrating the turn signal switches only in general form. As is the case with the other embodiments, like reference letters and numerals are used to designate like or similar parts or components. FIG. 8a illustrates a control unit U which includes the noise eliminating circuit, peak hold circuit, comparator, output circuit and speed detector circuit. Inputs to the control unit U are the potentiometer 6 and the reed switch 50 of speed detector 50. Control signals $x_1$ and $y_1$ also are applied to the control unit for operating switches in the peak hold circuit therein as will be described in connection with a discussion of FIG. 8b.

As seen in FIG. 8a, the turn-signal switch 3 is connected between the flasher 4 and turn-signal lamps 1 and 2 as in the other Figures. A left turn lamp 1 or a right turn lamp 2 is selectively actuated to blink depending on the direction of operation of the turn-signal switch 3 as operated by the driver. This system also includes position lamps 130 (left) and 131 (right), and these generally are continuously lit during the running of the vehicle except when either of the turn-signal lamps 1 or 2 is energized. In this regard, a position lamp switch 132 is provided having a movable contact 133 and fixed contacts 134-135. The movable contact 133 of the position lamp switch 132 in its neutral position connects the power supply line 42 to both of the contacts 134 and 135. This occurs when the turn signal switch 3 is in its neutral position. Thus, when the vehicle is moving straight ahead and no turn has been selected via the turn signal switch 3, both of the position lamps 130 and 131 are energized and on. When it is desired to turn the vehicle and to indicate a turn, the turn signal switch 3 is moved to the left or to the right and, likewise, the movable contact 133 of the position lamp switch 132 is moved in a similar direction. For example, if a left turn is to be indicated, the turn signal switch 3 is rotated to the left as seen in FIG. 8a, and because of the mechanical link 136 the movable contact 133 of the position lamp switch 132 likewise is moved to the left and engages the fixed contact 134. This action causes the left lamp 130 to turn off and the right lamp 131 to remain on. Thus, the position lamp switch 132 interrupts the application of a voltage to the position lamp which corresponds to the direction of change of the running course of the vehicle. The position lamp switch 132 provides output signals $x_1$ and $y_1$ to indicate to the electrical system whether the steering direction is right or left. As will be apparent from the circuit of FIG. 8a, when a left turn is indicated, the signal $x_1$ is high (on) and the signal $y_1$ is low (off), and vice versa for a right turn. These signals $x_1$ and $y_1$ are applied to the control unit U and to a switch control circuit 138 (not FIG. 8b) therein. After the turn has been completed, the cancel solenoid 5 returns both of the switches 3 and 132 to their neutral positions in a manner similar to that of the other systems described earlier.

Turning now to a consideration of the detailed diagram in FIG. 8b, the turn signal switch 3 and position lamp switch 132 are shown therein diagrammatically. The signals $x_1$ and $y_1$ are applied to the switch control circuit 138 in the control unit U. The steering angle sensor potentiometer 6 is connected to a noise eliminating circuit A within the control unit U. The reed switch 50 is connected to a speed detector E also within the control unit U. The output signal of the potentiometer 6 varies with the position of the handle bars as was the case with the systems of the other Figures. Similarly, the output signal of the potentiometer 6 is applied to the noise eliminating circuit A, the input/output characteristic of which is regulated by the speed signal "a" from the speed detector E applied on line 39 to a semiconductor switch 140.

The output of the circuit A is reduced in accordance with the running speed of the vehicle by attenuating the input signal from the potentiometer when the running speed is low in a manner like that described before. The frequency of the signal on line 139 to the semiconductor 140 increases as the running speed increases, and decreases as the running speed decreases likewise as earlier described. Therefore, the switch 140 is switched "on" by the signal on the line 39 more often when the running speed is high and less often when the running speed is low. Accordingly, the time constant of a resistor 141 and capacitor 142 virtually changes according to the running speed in the same manner described earlier. The time constant is larger while the running speed is low, and gradually approaches a time constant determined by the resistance of the resistor 141 and the capacitance of the capacitor 142 as the running speed becomes higher. Through this electrical action, the signals from the potentiometer 6 during high speed running are almost directly transmitted to amplifiers 144, 145, and 146, which are similar to the amplifiers 47-49 of FIG. 4. On the other hand, the signals provided by the potentiometer 6 during low speed running are attenutated by the circuit A before being applied to the amplifiers 144-146. A transistor 148 and resistors 149 and 150 at the input of circuit A in FIG. 8b form a buffer circuit between the potentiometer 6 and the other circuit components of the noise eliminating circuit A and prevent the circuit A from affecting the output signal from the potentiometer 6.

The speed detector circuit E includes a transistor 152 which is driven by a capacitor 153 from the reed switch 50 so as to generate a voltage at a junction point 154 between a resistor 155 and capacitor 156 in proportion to the number of pulses provided by the reed switch 50. A semiconductor switch 157 is switched on and off by the variations in voltage at the junction point 154 and, accordingly, the frequency at which the switch 157 is turned on and off increases with an increase in the running speed of the vehicle and decreases with a decrease in such running speed. The output signal on the line 39 from the speed detector circuit E is applied to control the switch 140 in the noise eliminating circuit A as described previously.

The output circuit of the noise eliminating circuit A includes a field effect transistor 160, and the output signal of circuit A is sent to the following peak hold circuit B via this transistor. A field effect transistor has a high input impedance and thereby minimizes discharge of the capacitor 142 and reduces the chance of any further charge being added or substracted from the capacitor 142 by the amplifiers 144, 146. The peak hold circuit B includes semiconductor switches 162 and 163 which are controlled by the signals x and y which are derived from the position lamp circuit described earlier. When the control signal x on a line 164 is high, the upper switch 162 of the peak hold circuit B is turned on, and when the control signal x on the line 164 is low the switch 162 is turned off. The control signal x on the line 164 is high when the position lamp switch 132 is in its neutral position and when it is switched to indicate a left turn. Similarly, when the control signal y on the line 165 is high, the lower switch 163 in the peak hold circuit B is turned on, and when the signal y is low the switch 163 is turned off.

Accordingly, while the vehicle is running with the turn signal switch 3 in the neutral position, both of the semiconductor switches 162 and 163 remain on since both of the control signals x and y on respective lines 164 and 165 are at a high level. In this state, the voltage at the upper terminal of a resistor 167 in the output stage of the peak hold circuit B is equal to the voltage at the upper terminal of a resistor 60 of the noise eliminating circuit A. Therefore, the outputs of respective differential amplifiers 145 and 146 of the comparator C remain at a low level which is lower than the voltage at a junction point 169 and which voltage is determined by the value of resistors 170 and 171. Accordingly, the output circuit D does not energize the cancel solenoid 5 since the output of an amplifier 172 in the output stage of the comparator C and transistors 173 and 174 in the output circuit D are not turned on.

When the turn signal switch 3 is turned either to the right or to the left, the position lamp switch 132 also is operated in a manner as described previously. The corresponding turn signal lamp 1 or 2 blinks and, at the same time, the corresponding position lamp 130 or 132 is turned off since no voltage is applied to that particular lamp and, consequently, one of the control signals x or y on lines 164 or 165 is low. Therefore, a particular one of the semiconductor switches 162 or 163 in the peak hold circuit B which is controlled by the low control signal x or y is turned off. In this embodiment of the invention, the circuit is arranged so that the upper semiconductor switch 162 in the peak hold circuit B is turned off when the handle bars are turned in a particular direction (i.e., to the right) and in this case the potentiometer is arranged to provide a high signal for such right turn, and the lower semiconductor switch 163 is arranged to be switched off for the opposite direction of steering (i.e., to the left) and the potentiometer is arranged such that its signal goes low. Then, during a turn one of the switches 162 or 163 remains on. The switch which remains on during a turn provides a signal from the amplifier 144 to the storage capacitor 176 (which is equivalent to the capacitor 70 of FIG. 4, the capacitors 72-73 of FIG. 5, the capacitor 94 of FIG. 6 and the capacitor 94 of FIG. 7a) which stores a maximum voltage indicative of the maximum steering angle. That is, the capacitor 176 stores the maximum signal from the steering potentiometer 6, as attenuated by the noise eliminating circuit A. The voltage on the capacitor 176 is buffered by a field effect transistor 177 which has a high input impedance and prevents variations in the voltage on the capacitor 176 in the same manner as does the field effect transistor 160 in the noise eliminating circuit A.

The momentarily changing terminal voltage (actual or instantaneous steering angle) of output resistor 60 of the noise eliminating circuit A is applied to the differential amplifiers 145-146 in the comparator C, and likewise the terminal voltage of the resistor 167 at the output of the peak hold circuit B (which represents the maximum steering angle) is applied to these differential amplifiers. The amplifier 145 functions as a right turn comparator and the amplifier 146 functions as a left turn comparator. When the output of either one of the amplifiers 145 or 146 becomes higher than a voltage at the junction 169 and as determined by resistors 170-171, the output of the amplifier 172 goes high and turns on the transistor 173. Consequently, the transistor 174 is turned on to supply contact to the cancel solenoid 5 to restore the turn signal switch and the position lamp switch 132 to their respective neutral or normal positions to thereby complete automatic cancelling of the turn signal. The return angle of the steering device with respect to the maximum steering angle effectively is electrically measured by the differential amplifier 145 or 146 and as compared to the voltage on the junction point 169, and when the measured return angle reaches an angle (such as several degrees) determined by the voltage at junction 169 the operation of the turn signal is automatically cancelled. This embodiment of the invention provides a simplified construction for the switching system of the peak hold circuit B by taking advantage of the operating characteristics of the position lamp circuit.

While preferred embodiments have been described and illustrated, it will be apparent to those skilled in the art that changes can be made therein without departing from the present invention.

What is claimed is:

1. A turn signal system for vehicles wherein the turn signal is automatically cancelled when a steering device of the vehicle returns to a given position, comprising
   turn signal means including indicators for indicating turn directions of a vehicle and switch means operable for selecting one of said indicators when a turn is to be indicated,
   sensing means for sensing the steering angle of the vehicle and providing a steering angle signal,
   storage means responsive to said steering angle signal for storing an electrical signal which is a function of a predetermined deviation from a normal steering angle of a vehicle when a turn has been selected,
   comparator means responsive to the signal stored by the storage means and responsive to a signal which is a function of instantaneous steering angle for providing an output control signal when a steering device of the vehicle has been returned to a steering angle near its normal position, and
   output means connected to the turn signal means for cancelling the turn indication in response to said control signal.

2. A turn signal system for vehicles wherein the turn signal is automatically cancelled when a steering device of the vehicle returns to a given position, comprising
   turn signal means including indicators for indicating turn directions of a vehicle and switch means operable for selecting one of said indicators when a turn is to be indicated,
   sensing means for sensing the steering angle of the vehicle and providing a steering angle signal,
   storage means responsive to said steering angle signal for storing an electrical signal which is a function of a predetermined deviation from a normal steering angle of a vehicle when a turn has been selected,
   comparator means responsive to the signal stored by the storage means and responsive to a signal which is a function of instantaneous steering angle for providing an output control signal when a steering device of the vehicle has been returned to a steering angle near its normal position, speed detector means for sensing the speed of the vehicle and providing a speed signal proportional thereto, attenuating circuit means responsive to said speed signal for attenuating the steering angle signal from said sensing means prior to application thereof to said storage means, and wherein said steering angle signal from said sensing means is attenuated more during low speed operation of the vehicle, and output means connected to the turn signal means for cancelling the turn indication in response to said control signal.

3. A system as in claim 2 wherein said predetermined deviation from a normal steering angle of a vehicle is a maximum steering angle after said switch means has been operated, and said storage means comprises a peak hold circuit for storing the maximum signal level received from said attenuating circuit means after being enabled by said turn signal means.

4. A system as in claim 3 wherein said peak hold circuit comprises first and second switching means and storage capacitor means, one of said switching means being enabled by said turn signal means during left or right turn indication to allow said storage capacitor means to store said electrical signal which is a function of a maximum steering angle for a respective left or right turn.

5. A system as in claim 4 wherein said storage capacitor means comprises a pair of storage capacitors, one for storing a signal which is a function of a maximum left steering angle and the other for storing a signal which is a function of a maximum right steering angle.

6. A system as in claim 2 wherein said sensing means includes a potentiometer, and said turn signal means includes switching means for reversing connections to the potentiometer for respective left and right turn directions of the steering device.

7. A system as in claim 4 wherein said first and second switch means of said peak hold circuit comprise semiconductor switches for respective left turn and right turn operations of the steering device and operated in response to operation of the switch means of the turn signal means.

8. A system as in claim 7 wherein said switch means of said turn signal means comprises a turn signal switch connected with said indicators and includes a position indicator switch for supplying respective enable signals to one or the other of said semiconductor switches of said peak hold circuit.

9. An automatic turn signal cancelling system for vehicles wherein the turn signal is automatically cancelled when a steering device of the vehicle returns to a given position, comprising sensing means responsive to a steering device of a vehicle for providing a steering angle signal which is a function of the steering angle of the vehicle, noise eliminating circuit means responsive to said steering angle signal and for reducing noise in said signal as a function of vehicle speed, peak hold circuit means for receiving an output signal from the noise eliminating circuit means and holding the output of the noise eliminating circuit means when it reaches a maximum level for a given vehicle turn condition, and comparator circuit means for receiving the output of the noise eliminating circuit means and the signal held by said peak hold circuit means for a given turn condition and for performing a comparison thereof to provide an output control signal to indicate that a turn signal is to be cancelled when a steering device of the vehicle has been returned to a steering angle near its normal position.

10. A system as in claim 9, including turn signal means including indicators for indicating turn directions of a vehicle and switch means operable for selecting one of said indicators when a turn is to be indicated, said turn signal means providing a signal to enable said peak hold circuit means.

11. A turn signal system for vehicles wherein the turn signal is automatically cancelled when a steering device of the vehicle returns to a given position, comprising turn signal means including indicator lamps for indicating respective turn directions of a vehicle and including switch means operable by the driver of the vehicle for selecting one of said indicators when a respective left turn or right turn is to be indicated, sensing means for sensing the steering angle of a steering device of a vehicle and for providing an electrical steering angle signal, noise eliminating circuit means for receiving said steering angle signal and attenuating said signal as a function of vehicle speed, the signal being attenuated to a greater extent during low speed operation of the vehicle and for providing an attenuated steering angle signal, peak hold circuit means responsive to said attenuated steering angle signal for storing an electrical signal which is a function of a maximum steering angle for a given turn direction of a vehicle after a turn has been selected, said turn signal means providing a signal to enable the peak hold circuit means when a turn indication has been selected by said switch means of said turn signal means, comparator means responsive to the signal stored by the peak hold circuit means and responsive to an attenuated steering angle signal which is a function of instantaneous steering angle for providing an output control signal when a steering device of the vehicle has been returned to a predetermined position near its normal position, and output means connected to the turn signal means for cancelling the turn indication in response to said control signal.

* * * * *